(12) United States Patent
Nakajima

(10) Patent No.: US 11,884,048 B2
(45) Date of Patent: Jan. 30, 2024

(54) DECORATIVE SHEET, EMBOSSING METHOD AND EMBOSSING DIE

(71) Applicant: SEIREN CO., LTD., Fukui (JP)

(72) Inventor: Shigeru Nakajima, Fukui (JP)

(73) Assignee: SEIREN CO., LTD.

( * ) Notice: Subject to any disclaimer, the term of this patent is extended or adjusted under 35 U.S.C. 154(b) by 0 days.

(21) Appl. No.: 16/969,244

(22) PCT Filed: Jan. 22, 2019

(86) PCT No.: PCT/JP2019/001933
§ 371 (c)(1),
(2) Date: Aug. 12, 2020

(87) PCT Pub. No.: WO2019/159613
PCT Pub. Date: Aug. 22, 2019

(65) Prior Publication Data
US 2021/0001592 A1    Jan. 7, 2021

(30) Foreign Application Priority Data

Feb. 13, 2018   (JP) ................. 2018-022788

(51) Int. Cl.
*B32B 3/30*     (2006.01)
*B29C 59/02*    (2006.01)
(Continued)

(52) U.S. Cl.
CPC .............. *B32B 3/30* (2013.01); *B29C 59/026* (2013.01); *B32B 5/024* (2013.01); *B32B 5/026* (2013.01);
(Continued)

(58) Field of Classification Search
CPC .......... B32B 3/30; B32B 5/024; B32B 5/026; B32B 5/18; B32B 5/245; B32B 38/06;
(Continued)

(56) References Cited

U.S. PATENT DOCUMENTS 7,481,900 B1 *   1/2009  Quinif ................... E06B 3/7001
                                                    156/196
2004/0206029 A1 * 10/2004  Luetgert ............... B29C 33/424
                                                    52/313

(Continued)

FOREIGN PATENT DOCUMENTS

CN    105992694 A    10/2016
CN    205800668 U    12/2016
(Continued)

OTHER PUBLICATIONS

International Search Report for Application No. PCT/JP2019/001933 dated May 7, 2019, 1 page.

*Primary Examiner* — Nathan L Van Sell
(74) *Attorney, Agent, or Firm* — Lerner David LLP

(57) ABSTRACT

A decorative sheet includes a base material and a concave portion. The concave portion is provided on a front face of the base material. In the concave portion, a depth direction coincides with a thickness direction of the base material. The concave portion includes a first concavo-convex pattern and a second concavo-convex pattern. The first concavo-convex pattern is provided in a first region of an inner surface of the concave portion. The second concavo-convex pattern is a concavo-convex pattern different from the first concavo-convex pattern. The second concavo-convex pattern is provided in a second region of the inner surface of the concave portion which is different from the first region.

9 Claims, 9 Drawing Sheets

(51) Int. Cl.
*B32B 5/02* (2006.01)
*B32B 5/18* (2006.01)
*B32B 5/24* (2006.01)
*B32B 38/06* (2006.01)
*B29L 31/30* (2006.01)

(52) U.S. Cl.
CPC ................ *B32B 5/18* (2013.01); *B32B 5/245* (2013.01); *B32B 38/06* (2013.01); *B29K 2713/00* (2013.01); *B29K 2715/003* (2013.01); *B29L 2031/3005* (2013.01)

(58) Field of Classification Search
CPC .......... B32B 2250/03; B32B 2260/046; B32B 2262/0238; B32B 5/022; B32B 2262/0253; B32B 2262/0284; B32B 2266/0278; B32B 2451/00; B32B 9/046; B32B 2260/021; B32B 2250/40; B32B 2262/0261; B29C 59/026; B29C 59/022; B29C 59/046; B29K 2713/00; B29K 2715/003; B29L 2031/3005; B44B 5/0047; B44B 5/028; B44C 1/24
See application file for complete search history.

(56) References Cited

U.S. PATENT DOCUMENTS

| | | | | |
|---|---|---|---|---|
| 2005/0115198 A1* | 6/2005 | Lynch | ............... | E06B 3/7001 52/784.1 |
| 2008/0274331 A1* | 11/2008 | Lynch | ............... | E06B 3/7001 428/139 |
| 2012/0052262 A1* | 3/2012 | Tajima | ............... | B60R 13/02 428/195.1 |
| 2012/0159855 A1* | 6/2012 | Pfau | ............... | B29C 65/02 49/381 |
| 2013/0087942 A1* | 4/2013 | Kimishima | ............ | B29C 39/10 249/83 |
| 2014/0260080 A1* | 9/2014 | Swartzmiller | ........ | B29C 70/465 52/784.1 |
| 2015/0322710 A1* | 11/2015 | Allen | ............... | B44B 5/026 428/170 |
| 2016/0325535 A1 | 11/2016 | Ueno et al. | | |
| 2017/0334127 A1* | 11/2017 | Kitano | ............... | B60N 2/5891 |

FOREIGN PATENT DOCUMENTS

| | | |
|---|---|---|
| CN | 206475439 U | 9/2017 |
| EP | 3130462 A1 | 2/2017 |
| JP | 5569426 A | 5/1980 |
| JP | H07276461 A | 10/1995 |
| JP | 2000008538 A | 1/2000 |
| JP | 2000038000 A | 2/2000 |
| JP | 2005261581 A | 9/2005 |
| JP | 2007276285 A | 10/2007 |
| JP | 2008194950 A | 8/2008 |
| JP | 2010188608 A | 9/2010 |
| JP | 5913755 B1 | 5/2016 |

* cited by examiner

<CUTTING POSITION: LINE I – I>

<CUTTING POSITION: LINES II - II AND III – III>

DECORATIVE SHEET, EMBOSSING METHOD AND EMBOSSING DIE

CROSS-REFERENCE TO RELATED APPLICATIONS

This application is a national phase entry under 35 U.S.C. § 371 of International Application No. PCT/JP2019/001933 filed Jan. 22, 2019, which claims the priority from Japanese Patent Application No. 2018-022788 filed in the Japanese Patent Office on Feb. 13, 2018, the entire contents of which are hereby incorporated by reference.

TECHNICAL FIELD

The present invention relates to a decorative sheet, an embossing method for manufacturing the decorative sheet and an embossing die for manufacturing the decorative sheet.

BACKGROUND

Techniques related to decorative sheets have been proposed. For example, in patent document 1, a seat skin material for a vehicle is disclosed. The seat skin material has a concavo-convex pattern. The seat skin material is manufactured as follows. That is, in the manufacturing method of the seat skin material, a laminated sheet passes between an embossing roll and a heat roll while being pressed. The laminated sheet is formed by laminating and integrating a front face fabric and a base material which is a cushion layer or by laminating and integrating the front face fabric and a fibrous base material. The embossing roll is set at a temperature of 100 to 250° C. The heat roll is set at a temperature of 100 to 250° C. The processing speed is set at 0.3 to 10 m/min. This manufacturing method can be performed by arranging a calender roll on the opposite side to the heat roll so as to be in contact with the embossing roll. The laminated sheet is in contact with the circumferential of the embossing roll by half.

In patent document 2, a seat skin material is disclosed. The seat skin material is formed by giving an embossed pattern to the front face of an elongated material. The manufacturing method includes a step of pressing the elongated material. In this step, the elongated material passes between an embossing roll and a flat roll. The embossing roll is provided with a plurality of embossing portions protruding from a base surface. The embossing portions include long side surfaces and short side surfaces. The long side surfaces and the short side surfaces are formed perpendicular to the base surface of the embossing roll. In the embossing portions, the highest part from the base surface is formed as flat top surfaces substantially parallel to the base surface. The long side surfaces and the top surfaces are continuous. Five bumps are formed between the short side surfaces and the top surfaces. The five bumps are formed in the same shape and the same size. Each of the bumps are composed of bottom surfaces and elevation surfaces. The bottom surfaces are surfaces substantially parallel to the base surface. The elevation surfaces are surfaces substantially perpendicular to the base surface. The plurality of embossing portions are arranged in the following state. The state previously described is a state in which the bumps of two adjacent embossing portions face each other. Furthermore, the state previously described is a state in which the long side surfaces of two adjacent embossing portions face each other. A clearance of about 1 mm is formed between the base surface and a front face fabric of the elongated material. The base surface does not contact the front face of the front face fabric of the elongated material. On the front face fabric side of the seat skin material, concave portions are formed by heating and pressing the embossing portions. The front face of the elongated material pressed at the portion where the bumps of the two embossing portions face each other has a shape in which gentle inclined surfaces are adjacent to each other. The front face of the elongated material pressed at the portion where the long side surfaces of the two embossing portions face each other is a steep inclined surface close to vertical. In the seat skin material, the surface gloss changes depending on a viewing direction. A fine level difference due to the bumps of the embossing portions is visually recognized as a thin horizontal line formed on the gentle inclined surface.

In patent document 3, a seat sheet material is disclosed. The seat sheet material is a skin material alone or a laminate body including the skin material. The seat sheet material has a concavo-convex shape on a front face side of the skin material. The concavo-convex shape is formed by heat press molding. The concave portion has fine unevenness on a bottom surface. As a result, the bottom surface of the concave portion is in a matted state without gloss. The bottom surface of such a concave portion is formed by heat pressing using a heat press mold. In the heat press mold, the fine unevenness are formed on the surface of the embossing portion. In the heat press mold, the fine unevenness are formed by a sand blast method.

CITATION LIST

Patent Literature

Patent Document 1: JP-A No. 2007-276285
Patent Document 2: Japanese Patent No. 5913755
Patent Document 3: JP-A No. 2005-261581

SUMMARY OF INVENTION

Problems to be Solved by the Invention

In a decorative sheet, a concave portion is formed on a front face of a base material. The decorative sheet is used as a front face fabric of various products. There may be a need to differentiate products from competing products by other business operators. In this case, for example, a decorative sheet different from a known decorative sheet is required in terms of design properties. As such, the inventor studied the following technology for a decorative sheet including a concave portion. The previously described technology is a technology in which, when the front face of the decorative sheet is viewed from two or more different directions, a viewer of the decorative sheet is tricked that the same concave portion is a different concave portion. At that time, the inventor considered the use of embossing as a manufacturing method for forming a concave portion on the front face of the base material.

An object of the present invention is to provide a new decorative sheet serving as a front face fabric of a predetermined product, an embossing method for manufacturing the decorative sheet and an embossing die for manufacturing the decorative sheet.

Solutions to Problems

One aspect of the present invention is a decorative sheet including: a base material, and a concave portion which is provided on a front face of the base material and whose depth direction coincides with a thickness direction of the base material, wherein the concave portion includes, a first concavo-convex pattern in a first region of an inner surface of the concave portion, and a second concavo-convex pattern which is different from the first concavo-convex pattern in a second region of the inner surface which is different from the first region.

According to the decorative sheet, the state of the reflection of the light in the first region and the second region can be differed. When the front face of the decorative sheet is viewed from two or more different directions, a viewer of the decorative sheet can be tricked that the same concave portion is a different concave portion.

In the decorative sheet, the inner surface may include a plurality of surfaces, wherein the first concavo-convex pattern may be provided in the first region of a first surface of the plurality of surfaces, wherein the second concavo-convex pattern may be provided in the second region of the first surface. Further, the inner surface may include a first surface, and a second surface which is different from the first surface, wherein the first concavo-convex pattern may be provided in the first region of the first surface, wherein the second concavo-convex pattern may be provided in the second region of the second surface. In the decorative sheet, the first surface may be a bottom surface of the concave portion. Further, the first surface may be a wall surface of the concave portion. Furthermore, the first surface and the second surface may be wall surfaces of the concave portion.

According to each of the configurations mentioned above, it is possible to deal with various illusionary effects. The design variation of the decorative sheet can be enriched.

Another aspect of the present invention is an embossing method including: an embossing step which forms a concave portion on a front face of a base material, the concave portion has a depth direction which coincides with a thickness direction of the base material, and wherein in the embossing step, a first region of an inner surface of the concave portion is formed in a state to include a first concavo-convex pattern, and a second region of the inner surface which is different from the first region is formed in a state to include a second concavo-convex pattern which is different from the first concavo-convex pattern.

Still another aspect of the present invention is an embossing die including: a mold portion which corresponds to a concave portion which is formed on a front face of a base material in a state whose depth direction coincides with a thickness direction of the base material, and which contacts the front face of the base material, wherein the mold portion includes, a first concavo-convex portion which corresponds to a first concavo-convex pattern in a third region of an outer surface of the mold portion, the third region corresponds to a first region of an inner surface of the concave portion which is provided with the first concavo-convex pattern, and a second concavo-convex portion which corresponds to a second concavo-convex pattern in a fourth region of the outer surface of the mold portion, the fourth region is different from the third region which corresponds to a second region of the inner surface which is different from the first region which is provided with the second concavo-convex pattern which is different from the first concavo-convex pattern.

According to the embossing method and the embossing die described above, the decorative sheet described above can be manufactured. The embossing method and the embossing die can also be specified as the embossing method and the embossing die corresponding to the unspecified items which are not mentioned above among the items for specifying the decorative sheet described above.

Advantageous Effects of the Invention

According to the present invention, a new decorative sheet serving as a front face fabric of a predetermined product, an embossing method for manufacturing the decorative sheet and an embossing die for manufacturing the decorative sheet can be obtained.

DESCRIPTION OF THE EMBODIMENTS

Figure 1:
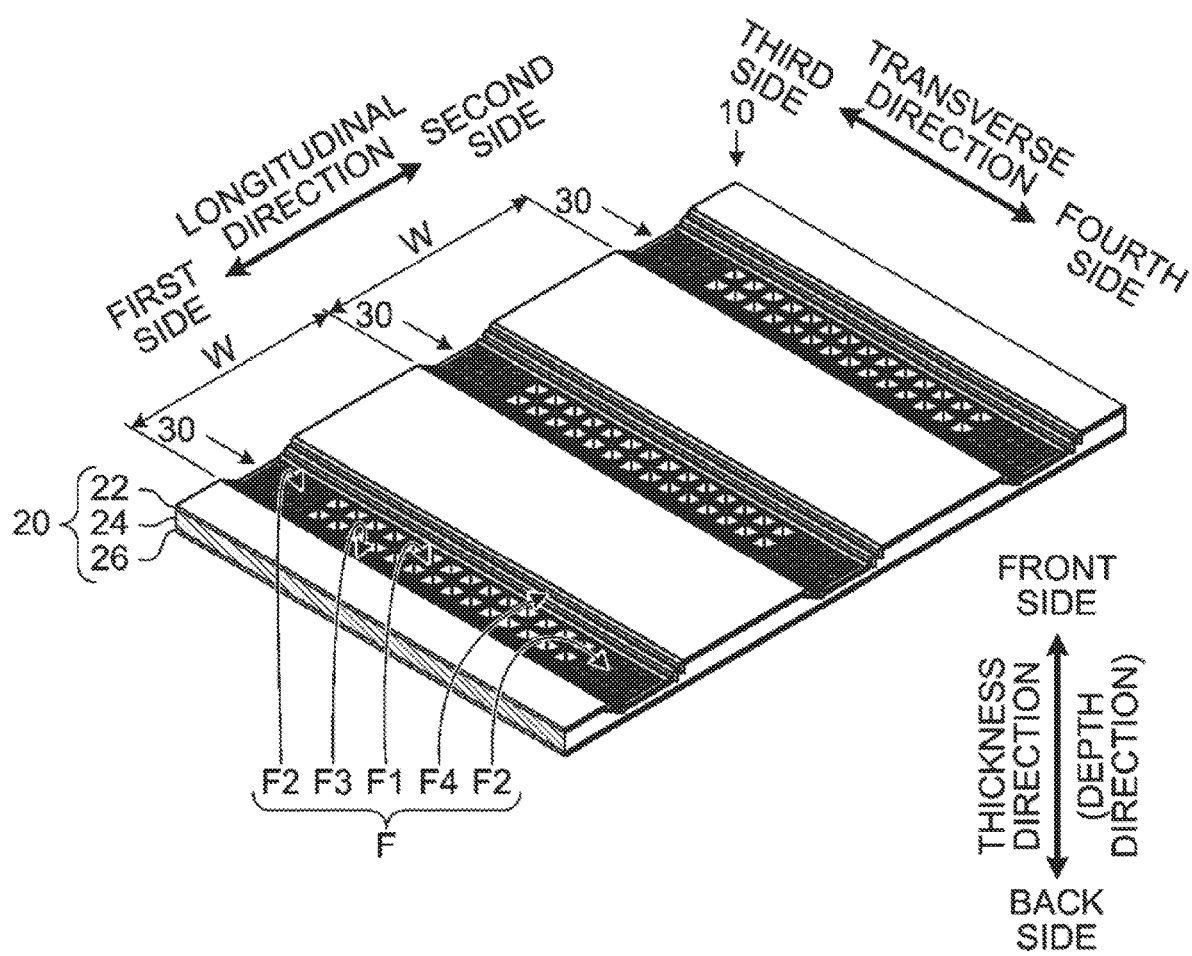
FIG. 1 is a perspective view which shows an example of a schematic structure of a decorative sheet.

Embodiments for carrying out the present invention will be described with reference to the drawings. The present invention is not limited to the configurations described below, and various configurations can be employed based on the same technical idea. For example, a part of the configurations shown below may be omitted or may be replaced by another configuration or the like. Other configurations may be included. Each drawing of the embodiment schematically shows a predetermined configuration. Therefore, in each drawing of the embodiment, correspondence with another drawing or correspondence with a numerical value which will be described later specifying the configuration in the drawing may not be accurate in some cases. In each drawing of the embodiment, hatching indicates a cross section.

<Decorative Sheet>

A decorative sheet 10 will be described with reference to FIGS. 1 to 5. The decorative sheet 10 includes a base material 20 and a concave portion 30 (see FIG. 1). The concave portion 30 is provided on a front face of the base material 20. In the embodiment, the decorative sheet 10 and the base material 20 are elongated sheet materials. Further, the decorative sheet 10 includes a plurality of concave portions 30. The plurality of concave portions 30 are formed on the front face of the base material 20 by an embossing apparatus 50. The embossing apparatus 50 carries out an embossing method. The embossing apparatus 50 and the embossing method will be described later. A longitudinal direction of the base material 20 is a longitudinal direction of the decorative sheet 10, and a transverse direction of the base material 20 is a transverse direction of the decorative sheet 10. In the embodiment, the longitudinal direction of the decorative sheet 10 and the base material 20 is referred to as "longitudinal direction" and the transverse direction of the decorative sheet 10 and the base material 20 is referred to as "transverse direction" (see FIGS. 1 and 3). The longitudinal direction and the transverse direction are orthogonal to each other. One side of the longitudinal direction is referred to as "first side" and the other side of the longitudinal direction is referred to as "second side". One side of the transverse direction is referred to as "third side" and the other side of the transverse direction is referred to as "fourth side".

As the base material 20, various sheet materials are employed. For example, various sheet materials having different thicknesses are employed as the base material 20. The base material 20 is a laminated body of two or more layers. In this case, the decorative sheet 10 is also a laminated body having the same number of layers as the base material 20. In the embodiment, the base material 20 is a three-layer laminated body and includes a first sheet 22, a second sheet 24 and a third sheet 26 (see FIG. 3). The base material 20 has cushioning properties. In this case, the decorative sheet 10 is also a three-layer laminated body (see FIG. 1) having cushioning properties. However, the base material 20 may be a laminated body of two layers or four layers or more. When the base material 20 is a two-layer laminated body, the base material 20 may be a laminated body including the first sheet 22 and the second sheet 24. Other than this, the base material 20 may be a single layer sheet material which is not a laminated body. When the base material 20 is a single-layer sheet material, the base material 20 may be a sheet material that can be employed as the first sheet 22. Further, the base material 20 may be a thick sheet material having cushioning properties.

Figure 3:
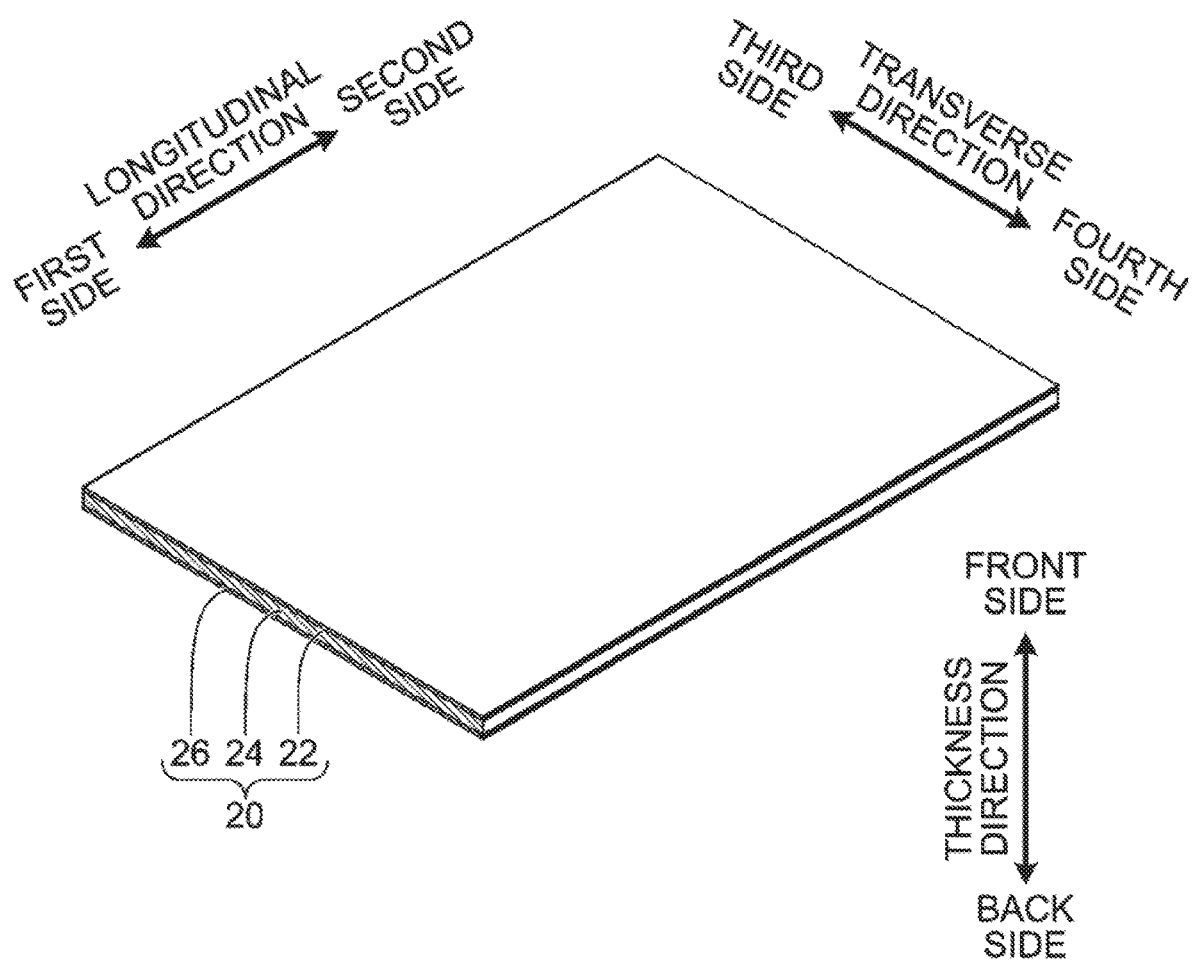
FIG. 3 is a perspective view which shows an example of a schematic structure of a base material. The base material corresponds to the decorative sheet of FIG. 1 before it is embossed.

In the embodiment, a thickness direction of the decorative sheet 10 and the base material 20 is referred to as "thickness direction" (see FIGS. 1 and 3). The thickness direction coincides with the direction in which the first sheet 22, the second sheet 24 and the third sheet 26 are laminated in the decorative sheet 10 and the base material 20. One side in the thickness direction is referred to as "front side" and the other side in the thickness direction is referred to as "back side". In the base material 20, the front side in the thickness direction is the side on which the first sheet 22 is provided, and the back side in the thickness direction is the side on which the third sheet 26 is provided. In each sheet material of the base material 20, the first sheet 22, the second sheet 24 and the third sheet 26, a front face is a surface that is on the front side in the thickness direction and a back face is a surface that is on the back side in the thickness direction (see FIG. 3). By embossing, the front face of the base material 20 becomes the front face of the decorative sheet 10 and the back face of the base material 20 becomes the back face of the decorative sheet 10 (see FIG. 1). That is, in the state of the decorative sheet 10, the front face of the decorative sheet 10 and the front face of the base material 20 mean the same surface. Likewise, in the state of the decorative sheet 10, the back face of the decorative sheet 10 and the back face of the base material 20 mean the same surface. For example, when the decorative sheet 10 is a front face fabric for interior products for a vehicle, the front face of the decorative sheet 10 is the surface of the previously described interior products. The user of the vehicle visually recognizes the front face of the decorative sheet 10 as the surface of the interior products.

A thickness of the base material 20 is appropriately determined in consideration of various conditions. However, the thickness of the base material 20 is better to be set to a predetermined value in the range of 0.3 to 19 mm. Preferably, the thickness of the base material 20 is set to a predetermined value in the range of 1.3 to 19 mm. Accordingly, a defined concave portion 30 can be formed on the front face of the base material 20. Each dimension of the base material 20 in the longitudinal direction and the transverse direction are appropriately determined in consideration of various conditions. The base material 20 is formed by bonding the first sheet 22 to the front face of the second sheet 24 and bonding the third sheet 26 to the back face of the second sheet 24 (see FIG. 3). A known method is employed for bonding the second sheet 24 and the first sheet 22 and bonding the second sheet 24 and the third sheet 26. For example, the bonding previously described is performed through an adhesive. Other than this, the bonding previously described is performed by frame laminate. When comparing the two construction methods previously described, the inventor considers that frame laminate is preferable in terms of process load at the time of manufacturing the base material 20 and weight reduction of the base material 20. Frame laminate is a technology that has already been put to practical use. Therefore, the description regarding the frame laminate is omitted.

As the first sheet 22, various sheet materials are employed. For example, fibrous sheet materials are employed as the first sheet 22. Examples of the fibrous sheet materials include woven fabrics, knitted fabrics, non-woven fabrics and natural leathers. Natural leather includes split leather. Further, as the first sheet 22, the following sheet material is employed. The sheet material previously described is a sheet material in which a synthetic resin is impregnated or laminated on a fibrous sheet material. Examples of such sheet material include artificial leathers, synthetic leathers and polyvinyl chloride leathers. Furthermore, a resin film is employed as the first sheet 22. Other than this, as the first sheet 22, a composite material of some or all of the sheet materials previously described is employed. A thickness of the first sheet 22 is better to be set to a predetermined value in the range of 0.3 to 5 mm. Preferably, the thickness of the first sheet 22 is set to a predetermined value in the range of 0.5 to 3 mm. However, the thickness of the first sheet 22 may be a value different from the range previously described. The thickness of the first sheet 22 is appropriately determined in consideration of various conditions.

In the first sheet 22, the fibrous sheet material may be a sheet material made of natural fibers or synthetic fibers. However, in view of the processability in embossing, the fibrous sheet material is better to be a sheet material made of synthetic fibers. Preferably, the fibrous sheet material is a sheet material made of thermoplastic resin fibers. Examples of the thermoplastic resin include polyolefin resins, polyester resins, polyamide resins, vinyl chloride resins and polyvinylidene chloride. Examples of the polyolefin resin include polyethylene and polypropylene. An example of the polyester resin includes polyethylene terephthalate. Examples of the polyamide resin include nylon 6 and nylon 66. The fibrous sheet material may be made of fibers made of one or two or more thermoplastic resins selected from the group including the plurality of resins previously described.

Assuming that the first sheet 22 is a sheet material in which a synthetic resin is impregnated or laminated on a fibrous sheet material. In this case, a known synthetic resin is employed as the resin to be impregnated or laminated. Examples of the synthetic resin previously described include polyurethane resins and vinyl chloride resins. The fibrous sheet material may be colored with a known dye or pigment. The dye or pigment is appropriately selected in consideration of various conditions.

The second sheet 24 has cushioning properties. Accordingly, the base material 20 has cushioning properties. As the second sheet 24, various sheet materials having cushioning properties are employed. An example of such sheet material includes a synthetic resin foam. An example of the synthetic resin foam includes a flexible polyurethane foam. A thickness of the second sheet 24 is better to be set to a predetermined value in the range of 1 to 14 mm. Preferably, the thickness of the second sheet 24 is set to a predetermined value in the range of 1 to 10 mm.

As the third sheet 26, various sheet materials are employed. For example, woven fabrics, knitted fabrics and non-woven fabrics are employed as the third sheet 26. In the third sheet 26, basis weight of the sheet material is appropriately determined in consideration of various conditions. For example, in the case in which the third sheet 26 is a woven fabric or a knitted fabric, the basis weight of the woven fabric or the knitted fabric is better to be set to a predetermined value in the range of 10 to 80 g/m$^2$. In the case in which the third sheet 26 is a non-woven fabric, the basis weight of the non-woven fabric is better to be set to a predetermined value in the range of 10 to 40 g/m$^2$. The third sheet 26 is, as the first sheet 22, in view of the processability in embossing, better to be a sheet material made of fibers made of thermoplastic resins. Examples of the previously described thermoplastic resins include above-described resins regarding the first sheet material 22.

Figure 4:
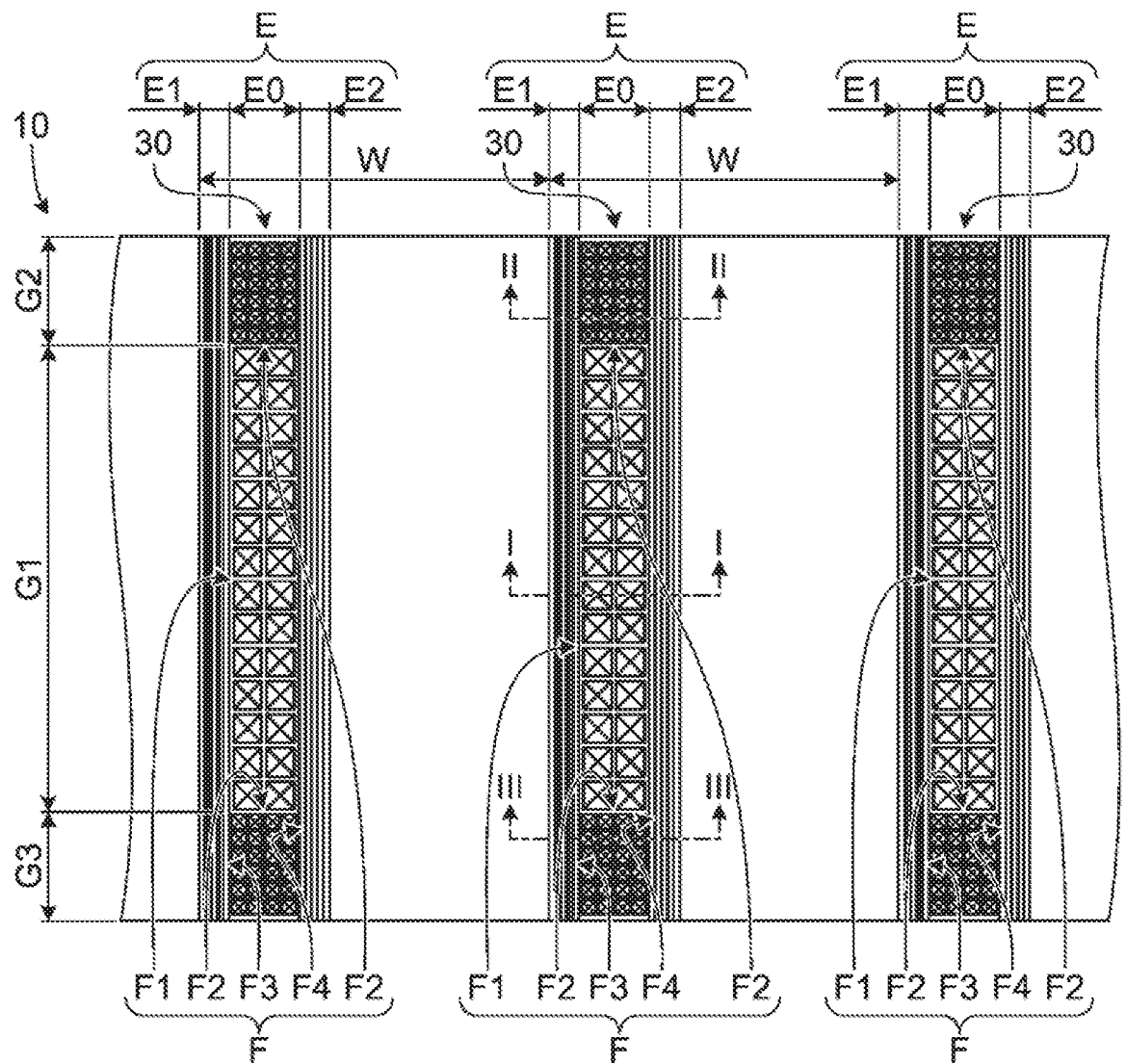
FIG. 4 is a plan view which shows an example of a schematic structure of the decorative sheet. It shows a front face of the decorative sheet of FIG. 1.
Figure 4:
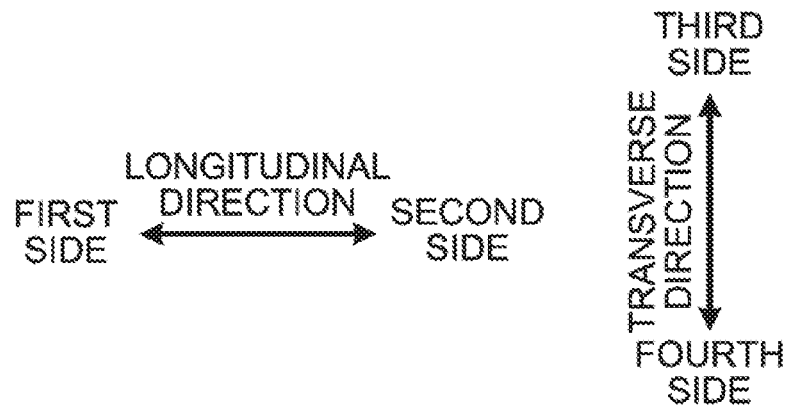

In the decorative sheet 10, the plurality of concave portions 30 are repeatedly arranged at predetermined intervals W in the longitudinal direction (see FIGS. 1 and 4). Accordingly, in the decorative sheet 10, the front face is concavo-convex shaped. However, such arrangement of the plurality of concave portions 30 is an example. The arrangement of the plurality of concave portions 30 is appropriately determined in consideration of various conditions. In the decorative sheet, the concave portion 30 may be provided at least one.

The plurality of concave portions 30 are concave portions having the same shape. The concave portion 30 does not penetrate the base material 20 in the thickness direction but crosses the base material 20 in the transverse direction (see FIGS. 1 and 4). The concave portion 30 has the following trapezoidal shape when the base material 20 is viewed from the side surface in the transverse direction. The trapezoidal shape previously described is a shape in which the front side in the thickness direction is the long side and the back side in the thickness direction is the short side (see FIG. 5). In the embodiment, the three surfaces forming an inner surface E of the concave portion 30 are referred to as "bottom surface E0", "first wall surface E1", and "second wall surface E2". In the decorative sheet 10, the bottom surface E0 is a surface extending along the front face of the base material 20 (see FIG. 5). The first wall surface E1 is as the following surface (see FIGS. 4 and 5). That is, the first wall surface E1 is connected to the bottom surface E0 on the second side in the longitudinal direction. Further, the first wall surface E1 is inclined at an inclination angle $\theta 1$ with respect to the front face of the base material 20. Furthermore, the first wall surface E1 is connected to the front face of the base material 20 on the first side in the longitudinal direction. The second wall surface E2 is as the following surface (see FIGS. 4 and 5). That is, the second wall surface E2 is connected to the bottom surface E0 on the first side in the longitudinal direction. Further, the second wall surface E2 is inclined at an inclination angle $\theta 2$ with respect to the front face of the base material 20. Furthermore, the second wall surface E2 is connected to the front face of the base material 20 on the second side in the longitudinal direction. The inclination angles $\theta 1$ and $\theta 2$ are same angles (see FIG. 5). In the embodiment, in the case in which the bottom surface E0, the first wall surface E1, and the second wall surface E2 are not distinct or are collectively called, they are referred to as "inner surface E".

However, the plurality of concave portions 30 may be concave portions having different shapes. Further, the shape of the concave portion 30 described above is an example. In the decorative sheet 10, the concave portion 30 may be a concave portion having a different shape from the shape described above. For example, the concave portion 30 may be a concave portion which does not cross the base material 20 in the transverse direction. The concave portion 30 may be a concave portion having different inclination angles $\theta 1$ and $\theta 2$. Further, the concave portion 30 may be a concave portion whose wall surface is annular. In this case, the concave portion 30 may be a concave portion having the bottom surface and the open end in any of a circular shape, an elliptical shape, a polygonal shape, a star shape and a flower shape. The concave portion 30 may be a concave portion which the bottom surface and the open end have the same shape or different shapes. Different shapes include similar shapes. Furthermore, the concave portion 30 may be a concave portion in which the center of the bottom surface and the center of the opening end are deviated in a state where the concave portion 30 is directly viewed straight from the front side in the thickness direction. Other than this, the concave portion 30 may be a concave portion whose bottom surface does not extend along the front face of the base material 20.

Figure 2:
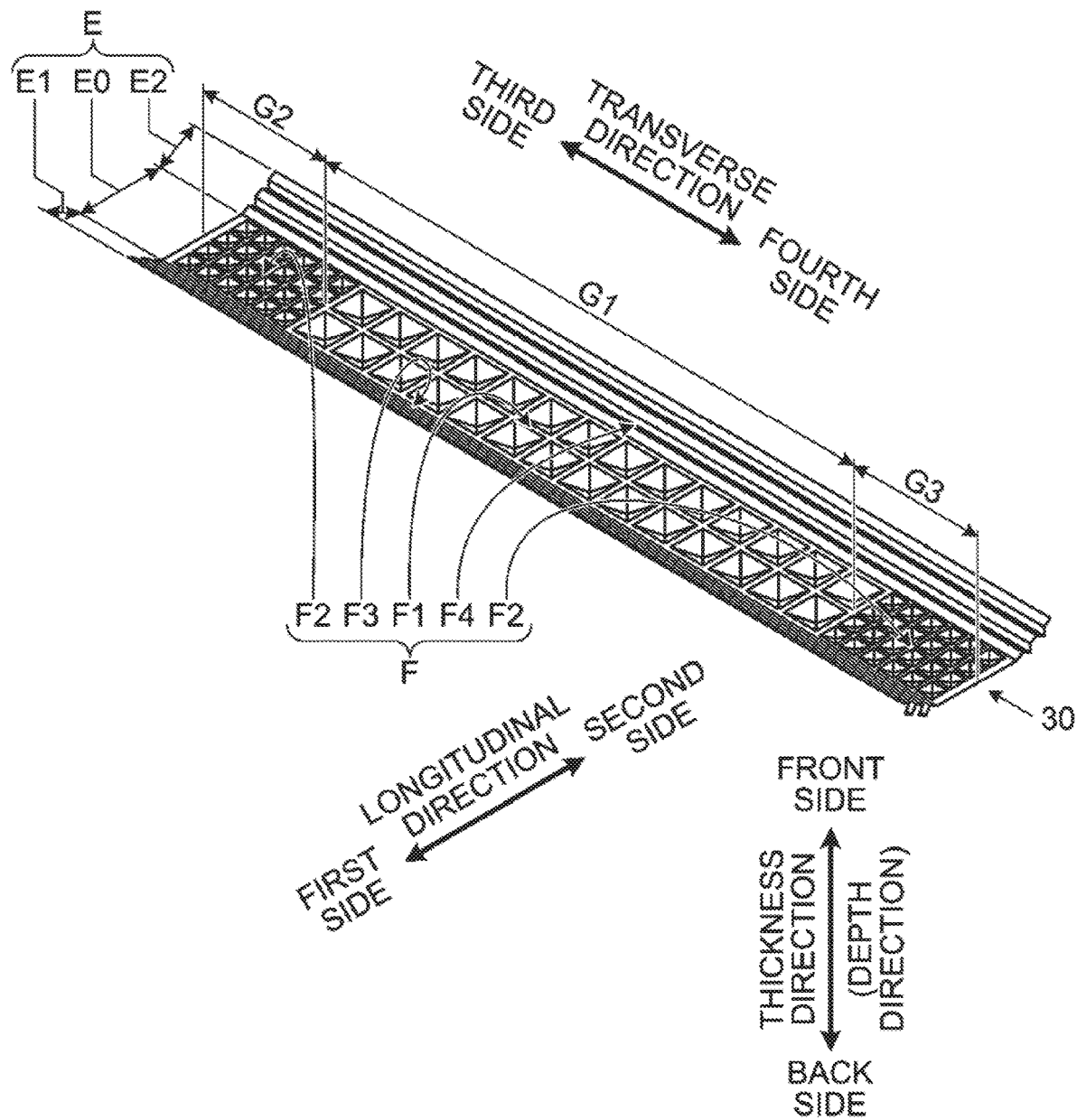
FIG. 2 is an enlarged perspective view which shows an inner surface of a concave portion. The inner surface of the concave portion corresponds to an inner surface of the concave portion of the decorative sheet of FIG. 1.

The inner surface E includes four types of concavo-convex patterns F (see FIGS. 2 and 4). In the embodiment, the four types of the concavo-convex patterns F are referred to as "concavo-convex pattern F1", "concavo-convex pattern F2", "concavo-convex pattern F3" and "concavo-convex pattern F4". The concavo-convex patterns F1, F2, F3 and F4 are different concavo-convex patterns F, respectively. In the case in which the concavo-convex patterns F1, F2, F3 and F4 are not distinct or are collectively called, they are referred to as "concavo-convex patterns F". The concavo-convex pattern F1 is provided in a region G1 of the bottom surface E0 (see FIGS. 2 and 4). The region G1 is a central region of the bottom surface E0 in the transverse direction. This central region includes a central position of the bottom surface E0 in the transverse direction. The concavo-convex pattern F2 is provided in regions G2 and G3 of the bottom surface E0 (see FIGS. 2 and 4). The regions G2 and G3 are, in the bottom surface E0, regions on the third side and fourth side in the transverse direction of the region G1. In the embodiment, the region G2 is on the third side in the transverse direction of the region G1, and the region G3 is on the fourth side in the transverse direction of the region G1. The concavo-convex pattern F3 is provided in the entire region of the first wall surface E1 (see FIGS. 2 and 4). The concavo-convex pattern F4 is provided in the entire region of the second wall surface E2 (see FIGS. 2 and 4).

However, regarding the correspondence between the inner surface E and the concavo-convex pattern F described above, the following first point and second point are examples. The first point is a region of the inner surface E where a plurality of types of concavo-convex patterns F are provided. The second point is the arrangement of a plurality of types of concavo-convex patterns F on the inner surface E. The first point and the second point are appropriately determined in consideration of various conditions. In the bottom surface E0, the concavo-convex pattern F may be one type. In the first wall surface E1, the concavo-convex pattern F may be a plurality of types. In the second wall surface E2, the concavo-convex pattern F may be a plurality of types.

Figure 5:
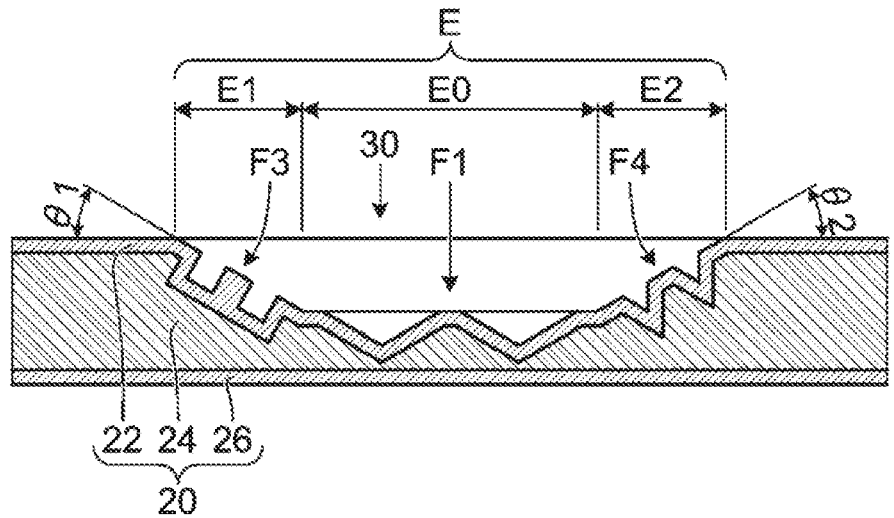
FIG. 5 is a side sectional view which shows a schematic structure of the concave portion. The cutting position of the upper row corresponds to line I-I in FIG. 4. The cutting position of the lower row corresponds to line II-II and line III-III in FIG. 4.
Figure 5:
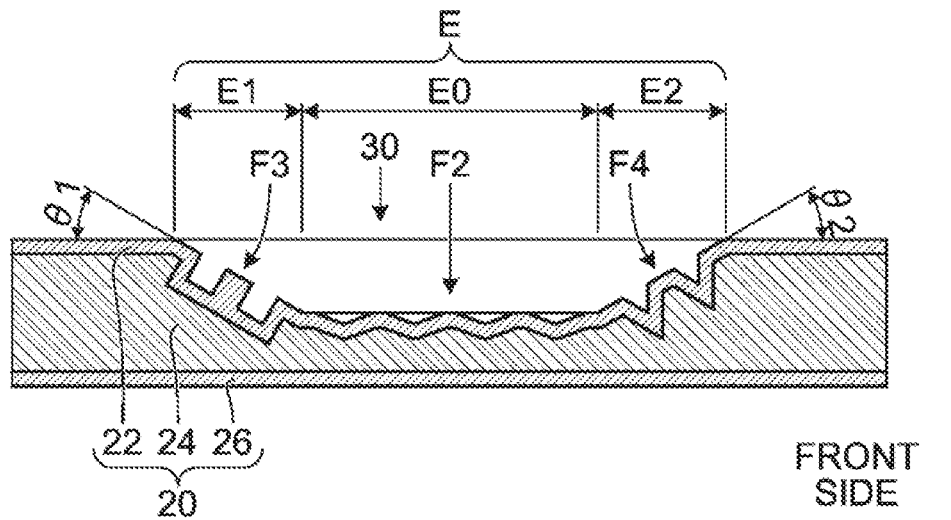

The concavo-convex pattern F1 is the concavo-convex pattern F in which the following first partial rows are provided in two rows at predetermined intervals in the longitudinal direction (see FIGS. 2, 4 and the upper row of FIG. 5). The first partial row is formed by arranging fourteen quadrangular pyramidal concave-shaped portions at predetermined intervals in the transverse direction (see FIGS. 2 and 4). The concavo-convex pattern F2 is a concavo-convex pattern F in which the following second partial rows are provided in four rows at predetermined intervals in the longitudinal direction (see FIGS. 2, 4 and the lower row of FIG. 5). The second partial row is formed by arranging six quadrangular pyramidal concave-shaped portions at predetermined intervals in the transverse direction (see FIGS. 2 and 4). Comparing the areas of the open end of the concave-shaped portion on the front side in the thickness direction of the concavo-convex patterns F1 and F2, and comparing the height differences of the unevenness of the concavo-convex patterns F1 and F2, the concavo-convex pattern F1 are both greater than the concavo-convex pattern F2 (see FIGS. 2, 4 and 5). The concavo-convex pattern F3 is the concavo-convex pattern F including two first grooves (see FIGS. 2, 4 and 5). The two first grooves are parallel to each other and cross the first wall surface E1 in the transverse direction. The first groove is a concave-shaped portion having a rectangular shape when the base material 20 is viewed from the side surface in the transverse direction (see FIG. 5). The concavo-convex pattern F4 is the concavo-convex pattern F including two second grooves (see FIGS. 2, 4 and 5). The two second grooves are parallel to each other and cross the second wall surface E2 in the transverse direction. The second groove is a concave-shaped portion having a triangular shape when the base material 20 is viewed from the side surface in the transverse direction (see FIG. 5).

However, the concavo-convex patterns F1, F2, F3 and F4 described above are examples. As the concavo-convex patterns F, various concavo-convex patterns are employed. The aspect of the concavo-convex pattern F is appropriately determined in consideration of various conditions. For example, in the concavo-convex pattern F, the plurality of concave-shaped portions may be arranged regularly (see "concavo-convex patterns F1, F2, F3 and F4" as examples), or the plurality of concave-shaped portions may be arranged irregularly (not shown). Further, in the concavo-convex pattern F, the concave-shaped portion may have a specific shape (see "concavo-convex patterns F1, F2, F3 and F4" as examples), or may have an irregular shape.

<Embossing Apparatus>

The embossing apparatus 50 will be described with reference to FIGS. 6 and 7. The embossing apparatus 50 is a processing apparatus that manufactures the decorative sheet 10. The embossing apparatus 50 conveys the elongated base material 20 fed out from a supply device 95 and performs embossing on the base material 20 (see FIG. 6). In the embossing apparatus 50, embossing is continuously performed. After being embossed by the embossing apparatus 50, the base material 20 is recovered by a recovery device 96 as the decorative sheet 10.

Figure 6:
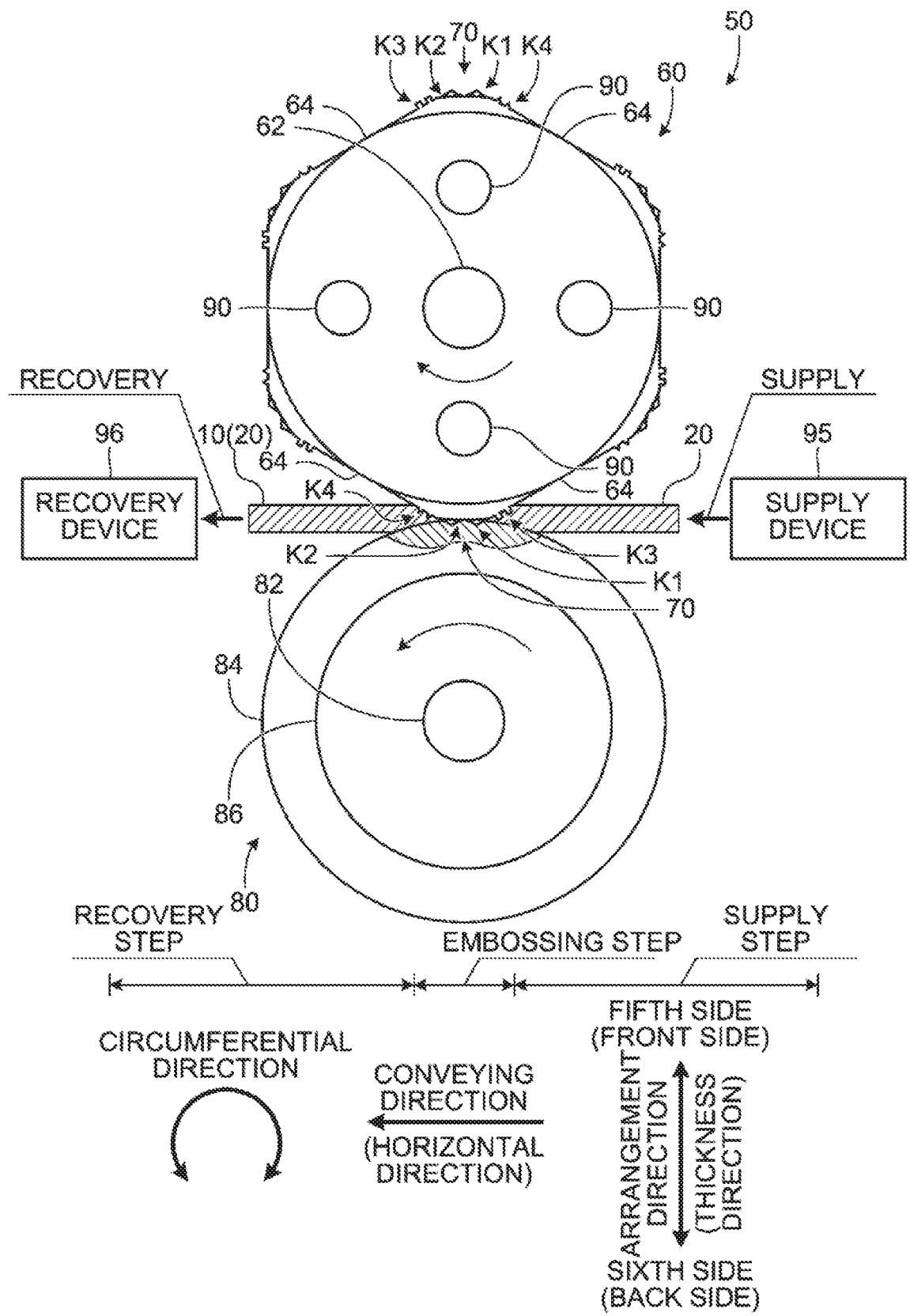
FIG. 6 is a side view which shows an example of a schematic structure of an embossing apparatus. An embossing die and an embossing receiving die have a roll shape. The state in which the embossing die is pressed against the embossing receiving die is shown. Among the base material and the decorative sheet, and an elastic unit of the embossing receiving die, a part into which a mold portion of the embossing die bites is shown as a cross section. In the base material and the decorative sheet, parts corresponding to the embossing apparatus are shown.

In FIG. 6, the illustrations of the following parts are simplified. The previously described parts are the base material 20 and the decorative sheet 10, and the supply device 95 and the recovery device 96. The base material 20 and the decorative sheet 10 have an aspect of an elongated sheet material which is continuous from the supply device 95 to the recovery device 96. As the supply device 95, a supply device provided in a known embossing apparatus can be employed. As the recovery device 96, a recovery device provided in a known embossing apparatus can be employed. Therefore, the description regarding the supply device 95 and the recovery device 96 is omitted. In the embodiment, a direction in which the base material 20 and the decorative sheet 10 are conveyed from the supply device 95 toward the recovery device 96 is referred to as "conveying direction". The conveying direction is a direction along the longitudinal direction.

The embossing apparatus 50 is provided with an embossing die 60, an embossing receiving die 80 and heating unit 90. The embossing die 60 have a roll shape. In this case, the embossing die 60 may be referred to as an embossing roll. The embossing receiving die 80 have a roll shape. In this case, the embossing receiving die 80 may be referred to as a receiving roll or a backup roll.

The embossing die 60 and the embossing receiving die 80 are provided side by side in an arrangement direction. The embossing die 60 is provided on a fifth side in the arrangement direction. The embossing receiving die 80 is provided on a sixth side in the arrangement direction. In the embodiment, the arrangement direction is the vertical direction, and the conveying direction is the horizontal direction. Further, the fifth side of the arrangement direction is an upper side in the vertical direction and the sixth side of the arrangement direction is a lower side in the vertical direction. In this case, the thickness direction (a depth direction of the concave portion 30) of the base material 20 coincides with the vertical direction. A shaft 62 of the embossing die 60 and a shaft 82 of the embossing receiving die 80 are in a parallel state. A width direction (see FIG. 7) of the embossing die 60 and a width direction of the embossing receiving die 80 coincide with the transverse direction. According to the third side and the fourth side in the transverse direction, one side in the width direction is referred to as "third side", and the other side in the width direction is referred to as "fourth side". The third side in the width direction corresponds to the third side in the transvers direction, and the fourth side in the width direction corresponds to the fourth side in the transvers direction. The arrangement direction may be a different direction from the vertical direction. The conveying direction may be a different direction from the horizontal direction. The conveying direction is better to be a direction orthogonal to the arrangement direction.

The embossing die 60 rotates in a direction corresponding to the conveying direction with the shaft 62 as a rotation axis. A driving force is given to the embossing die 60 from a drive unit. The drive unit is attached to the shaft 62. Along with this, the embossing die 60 rotates as previously described. In FIG. 6, the illustration of the drive unit is omitted. An example of the drive unit includes a motor. The following arrow shown in FIG. 6 indicates a rotation direction of the embossing die 60. The previously described arrow is a single arrow shown inside the embossing die 60. The embossing die 60 is formed of a same material as a known embossing die. For example, the embossing die 60 is made of metal. An example of the metal forming the embossing die 60 includes steel.

Figure 7:
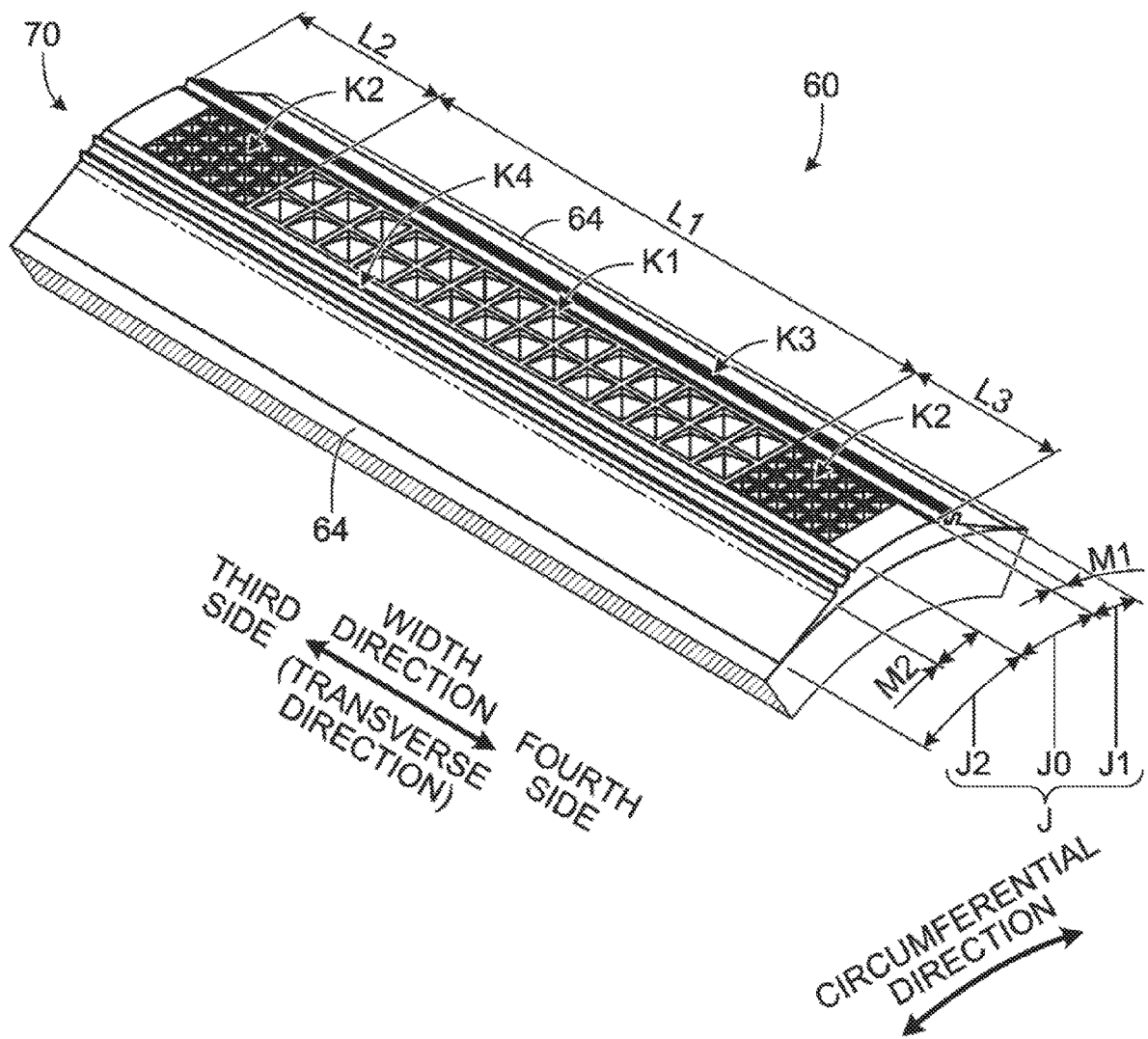
FIG. 7 is a partial perspective view which shows an example of a schematic structure of the embossing die. The mold portion of the embossing die is shown.

The embossing die 60 includes mold portions 70 (see FIGS. 6 and 7). The mold portions 70 have a shape corresponding to the concave portions 30. When producing the embossing method, the mold portions 70 are in contact with the front face of the base material 20 and presses the front face of the base material 20 (see FIG. 6). Along with this, the mold portions 70 form the concave portions 30 on the front face of the base material 20. The mold portions 70 include four types of concavo-convex portions K (see FIGS. 6 and 7). In the embodiment, the four types of concavo-convex portions K are referred to as "concavo-convex portion K1", "concavo-convex portion K2", "concavo-convex portion K3" and "concavo-convex portion K4". The concavo-convex portions K1, K2, K3 and K4 are different concavo-convex portions K, respectively. In the case in which the concavo-convex portions K1, K2, K3 and K4 are not distinct or are collectively called, they are referred to as "concavo-convex portions K". The concavo-convex portions K1, K2, K3 and K4 are provided on an outer surface J of the mold portion 70 (see FIG. 7). The outer surface J includes a top surface J0, a third wall surface J1 and a fourth wall surface J2. The top surface J0, the third wall surface J1 and the fourth wall surface J2 form the outer surface J. The top surface J0 is a top face of the mold portion 70 and corresponds to the bottom surface E0. The third wall surface J1 includes a region M1. The fourth wall surface J2 includes a region M2. The regions M1 and M2 are described later.

The concavo-convex portion K1 corresponds to the concavo-convex pattern F1. Thus, the concavo-convex portion K1 has a concavo-convex shape which corresponds to the concavo-convex pattern F1. In the decorative sheet 10, the concave portion 30 includes the concavo-convex pattern F1 in the region G1 of the bottom surface E0 (see FIGS. 2, 4 and 5). Therefore, in the mold portion 70, the concavo-convex portion K1 is provided in a region L1 which corresponds to the region G1 at the top surface J0 (see FIG. 7). The region L1 is a central region in the width direction of the top surface J0. This central region includes a central position in the width direction of the top surface J0.

The concavo-convex portion K2 corresponds to the concavo-convex pattern F2. Thus, the concavo-convex portion K2 has a concavo-convex shape which corresponds to the concavo-convex pattern F2. In the decorative sheet 10, the concave portion 30 includes the concavo-convex pattern F2 in the regions G2 and G3 of the bottom surface E0 (see FIGS. 2, 4 and 5). Therefore, in the mold portion 70, the concavo-convex portion K2 is provided in regions L2 and L3 which correspond to the regions G2 and G3 at the top surface J0 (see FIG. 7). The regions L2 and L3 are regions of the top surface J0 that are the third side and the fourth side in the width direction of the region L1. In the embodiment, the region L2 is on the third side in the width direction of the region L1, and the region L3 is on the fourth side in the width direction of the region L1.

The concavo-convex portion K3 corresponds to the concavo-convex pattern F3. Thus, the concavo-convex portion K3 has a concavo-convex shape which corresponds to the concavo-convex pattern F3. In the decorative sheet 10, the concave portion 30 includes the concavo-convex pattern F3 in the entire region of the first wall surface E1 (see FIGS. 2, 4 and 5). Therefore, in the mold portion 70, the concavo-convex portion K3 is provided in the region M1 which corresponds to the first wall surface E1 at the third wall surface J1 (see FIG. 7). The region M1 is a region which is a part of the third wall surface J1. The region M1 includes the entire third wall surface J1 in the width direction and connects with the top surface J0 in a circumferential direction. The circumferential direction is a circumference direction with the shaft 62 as a center. The circumferential direction coincides with the rotating direction and the opposite direction thereof of the embossing die 60. The circumferential direction corresponds to the longitudinal direction.

The concavo-convex portion K4 corresponds to the concavo-convex pattern F4. Thus, the concavo-convex portion K4 has a concavo-convex shape which corresponds to the concavo-convex pattern F4. In the decorative sheet 10, the concave portion 30 includes the concavo-convex pattern F4 in the entire region of the second wall surface E2 (see FIGS. 2, 4 and 5). Therefore, in the mold portion 70, the concavo-convex portion K4 is provided in the region M2 which corresponds to the second wall surface E2 at the fourth wall surface J2 (see FIG. 7). The region M2 is a region which is a part of the fourth wall surface J2. The region M2 includes the entire fourth wall surface J2 in the width direction and connects with the top surface J0 in the circumferential direction. The two-dot chain line which is shown on the fourth wall surface J2 in FIG. 7 is illustrated to explain the following boundary. The previously described boundary is a boundary of the region M2 on the opposite side of the top surface J0 in the circumferential direction.

In the decorative sheet 10, the plurality of concave portions 30 are repeatedly arranged at predetermined intervals W in the longitudinal direction (see FIGS. 1 and 4). Therefore, in the embossing die 60, the mold portions 70 are arranged at predetermined intervals in the circumferential direction to correspond to the arrangement of the plurality of concave portions 30 (see FIG. 6). The interval in the circumferential direction to arrange the plurality of mold portions 70 corresponds to the interval W.

The embossing receiving die 80 rotates in a direction corresponding to the conveying direction with the shaft 82 as a rotation axis. A rotation direction of the embossing receiving die 80 is opposite to the rotation direction of the embossing die 60. The embossing receiving die 80 is in contact with the back face of the base material 20. In the embossing apparatus 50, the embossing die 60 sandwiches the base material 20 together with the embossing receiving die 80. The embossing receiving die 80 is rotated in accordance with the rotation of the embossing die 60 while being in contact with the back face of the base material 20. The following arrow shown in FIG. 6 indicates the rotation direction of the embossing receiving die 80. The previously described arrow is a single arrow shown inside the embossing receiving die 80.

The embossing receiving die 80 includes an elastic unit 84 made of resin. The elastic unit 84 is provided on an outer peripheral surface of a main body unit 86. The elastic unit 84 is integrated with the main body unit 86 on the outer surface of the main body unit 86. The shaft 82 is fixed to the main body unit 86. The main body unit 86 is formed of the same material as the embossing die 60. In the elastic unit 84, the following surface is a smooth surface. The previously described surface is an outer peripheral surface of the elastic unit 84 that forms an outer peripheral surface of the embossing receiving die 80. In the embodiment, "Smooth" means, for example, a state having no height difference or a state having no concavo-convex. Therefore, "smooth surface" includes, for example, a smooth plane, a smooth curved surface and a smooth inclined surface. In the embossing receiving die 80 having a roll shape, the outer peripheral surface of the elastic unit 84 is a smooth curved surface.

The elastic unit 84 is formed of a known resin. However, the elastic unit 84 is better to be formed of a resin having a hardness of D95 or less. Preferably, the elastic unit 84 is formed of a resin having a hardness of A90 or less. More preferably, the elastic unit 84 is formed of a resin having a hardness of A70 or less. Each value previously described is an average value of hardness acquired by the following hardness test method. The previously described hardness test method is carried out conforming to JIS K6253-3: 2012 (vulcanized rubber and thermoplastic rubber—how to determine hardness—part 3: durometer hardness). The difference between the hardness test methods due to the difference of the Types A and D is the testing machine, and the test piece shape, the test environment, the testing time and testing numbers are the same.

[Hardness Test Method]
    Testing Machine
    Type D: Type D durometer (KOBUNSHI KEIKI CO., LTD. Digital rubber hardness tester DD4-D type)
    Type A: Type A durometer (KOBUNSHI KEIKI CO., LTD. Digital rubber hardness tester DD4-A type)
    Test piece shape (width×length×thickness): 40 mm×60 mm×11 mm
    Test environment (temperature, relative humidity): 23±2° C., 50±5% RH
    Measurement time: Moment
    Number of measurement points: 5 points By forming the elastic unit 84 with the resin having a hardness of D95 or less, the following effects can be obtained. That is, in the embossing apparatus 50, the elastic unit 84 is deformed when the base material 20 passes between the embossing die 60 and the embossing receiving die 80. In this case, the deformation of the elastic unit 84 is elastic deformation. Due to the deformation of the elastic unit 84, the area of the elastic unit 84 in contact with the back face of the base material 20 can be increased. Along with this, the concave portions 30 which match the shape of the mold portions 70 can be reproduced on the front face of the decorative sheet 10. In the concave portion 30, shine of the inner surface E can be suppressed. In FIG. 6, the illustration of the elastic unit 84 is simplified. In FIG. 6, the elastic unit 84 is not illustrated in a state in which the previously described deformation has occurred.

As the resin which forms the elastic unit 84, the following resin whose hardness is D95 or less is employed. Examples of the resin previously described include rubbers, thermoplastics elastomers and plastics. The inventor considers that rubber is preferable among the resins previously described. Examples of the rubbers include silicone rubber, nitrile rubber, chloroprene rubber, ethylene-propylene rubber, butyl rubber, urethane rubber, fluoro-rubber and natural rubber. The inventor considers that silicone rubber or fluoro-rubber is preferable in terms of heat resistance. The inventor considers nitrile rubber, urethane rubber or natural rubber is preferable in terms of durability. The inventor considers that silicone rubber is preferable among the rubbers previously described in terms of versatility. Silicone rubber has excellent heat resistance as previously described. Silicone rubber is inexpensive. The rubber forming the elastic unit 84 may be one or two or more kinds of rubbers selected from the group including the plurality of rubbers previously described. Other than this, the rubber forming the elastic unit 84 may be pure rubber. However, this rubber may contain one or more known additives. Examples of the additives previously described include fillers, plasticizers, vulcanizing agents and anti-aging agents.

The heating unit 90 is provided in the embossing die 60. The heating unit 90 is embedded in the embossing die 60. The heating unit 90 is an electric heater. In the embodiment, four heating units 90 are embedded at equiangular intervals in the embossing die 60. However, the heating unit 90 may be a different type of heating unit from the electric heater. The number of the heating units 90 may be three or less or five or more. The type and number of the heating units 90 are appropriately determined in consideration of various conditions. The arrangement of the heating units 90 in the embossing die 60 is appropriately determined in consideration of various conditions.

The heating units 90 heat the embossing die 60 to a predetermined temperature. The previously described temperature is appropriately set according to the type of the base material 20. For example, the previously described temperature is appropriately set in consideration of the material of one or both of the first sheet 22 and the second sheet 24. Assuming that the first sheet 22 is polyethylene terephthalate. The melting point of polyethylene terephthalate is 260° C. In this case, the heating units 90 heat the embossing die 60 to a predetermined value in the range of 60 to 260° C. Preferably, the heating units 90 heat the embossing die 60 to a predetermined value in the range of 60 to 220° C. More preferably, the heating units 90 heat the embossing die 60 to a predetermined value in the range of 130 to 210° C.

<Embossing Method>

The embossing method will be described with reference to FIGS. 1 to 6. The embossing method is performed by the embossing apparatus 50. The embossing method includes a supply step, an embossing step and a recovery step (see FIG. 6). The decorative sheet 10 of FIG. 1 is manufactured from the base material 20 of FIG. 3 by the embossing method. Therefore, it can be said that the embossing method is also the method for manufacturing the decorative sheet 10. In the embossing method, the supply step, the embossing step and the recovery step are sequentially and continuously performed while the base material 20 is continuously conveyed in the conveying direction. The supply step is continuously performed. The embossing step is continuously performed. The recovery step is continuously performed. In the embossing apparatus 50, in the case in which the embossing method is performed, the drive unit for the embossing die 60 is continuously driven.

In the embossing method, the concave portions 30 are formed on the front face of the base material 20 by pressing the base material 20 (see FIGS. 3 and 1). The heating units 90 heat the embossing die 60. The embossing method is performed in a state where the embossing die 60 is heated to a predetermined temperature. In the embossing apparatus 50, a heating unit such as the heating unit 90 is not provided in the embossing receiving die 80. Therefore, in the embossing method, the embossing receiving die 80 is not directly heated. However, in the embossing apparatus 50, the embossing receiving die 80 may be provided with a heating unit. Thereby, the embossing method can be performed in a state where the embossing receiving die 80 is heated to a predetermined temperature by the heating unit. When the heating unit is provided in the embossing receiving die 80, the temperature of the embossing receiving die 80 heated by the heating unit is appropriately set in consideration of various conditions. Whether or not the embossing receiving die 80 is provided with the heating unit is appropriately determined in consideration of various conditions.

Prior to performing the embossing method, the embossing apparatus 50 is adjusted so that the following position is in the following first state. The previously described position is a position in the arrangement direction of the embossing die 60 with respect to the front face of the base material 20. The first state is, when the base material 20 passes between the embossing die 60 and the embossing receiving die 80, a state in which a base surface 64 is not in contact with the front face of the base material 20. The base surface 64 is a region in the outer peripheral surface of the embossing die 60 where the mold portions 70 are not provided. In other words, the base surface 64 is a region in the outer peripheral surface of the embossing die 60 at a bottom side of the two adjacent convex shaped mold portions 70 in the circumferential direction. The previously described bottom side is, when the radial direction of the embossing die 60 having a roll shape is used as a reference, the center side (the side of the shaft 62).

Other than this, the embossing apparatus 50 may be in the following second state and third state. The second state is a state in which the mold portion 70 bites into the elastic unit 84 (see "mold portion 70" shown in the sixth side of the arrangement direction in FIG. 6). The third state is a state in which the following dimension is larger than the thickness of the base material 20. The previously described dimension is a dimension in the arrangement direction between the base surface 64 and the outer peripheral surface of the embossing receiving die 80. By performing the embossing method with the embossing apparatus 50 in the second state and the third state, the shape of the entire inner surface E can be defined. That is, the shapes of the bottom surfaces E0, the first wall surfaces E1 and the second wall surfaces E2 can be defined. Along with this, the design properties of the decorative sheet 10 can be improved.

The supply step is a step of supplying the base material 20 to the embossing apparatus 50 (see FIG. 6). That is, in the supply step, the base material 20 is fed out from the supply device 95. The base material 20 fed out from the supply device 95 is conveyed in the conveying direction and reaches the embossing apparatus 50.

The embossing step is a step of forming a plurality of concave portions 30 on the front face of the base material 20 (see FIG. 6). In the embossing step, the base material 20 that has reached the embossing apparatus 50 is embossed. In the front face of the base material 20, a predetermine range in the longitudinal direction is formed to the inner surface E which include the concavo-convex pattern F (see FIGS. 2 and 4). That is, in the embossing step, the second wall surface E2 is formed in the following first aspect, the bottom surface E0 is formed in the following second aspect, and the first wall surface E1 is formed in the following third aspect (see FIGS. 2, 4 and 5). The first aspect is an aspect which includes the concavo-convex pattern F4 in the entire region. The second aspect is an aspect which includes the concavo-convex pattern F1 in the region G1 and which includes the concavo-convex pattern F2 in the regions G2 and G3. The third aspect is an aspect which includes the concavo-convex pattern F3 in the entire region.

In the embossing step, the base material 20 conveyed in the conveying direction passes between the embossing die 60 and the embossing receiving die 80 during conveyance (see FIG. 6). At this time, the base material 20 is in contact with the elastic unit 84 with its back face and is supported by the embossing receiving die 80 from the back side. The base material 20 is in contact with the mold portion 70 with its front face and is pressed by the mold portion 70. The base material 20 is heated by the heat from the embossing die 60 heated by heating units 90. The mold portion 70 bites into the base material 20. In doing so, in the concavo-convex portion K, first, the concavo-convex portion K4 bites into the base material 20, then the concavo-convex portion K1 and two concavo-convex portions K2 bite into the base material 20, and finally, the concavo-convex portion K3 bites into the base material 20. By the embossing step, the base material 20 is formed into the decorative sheet 10 (see FIGS. 3 and 1). In the embossing step, the base material 20 passes between the embossing die 60 and the embossing receiving die 80 without making the front face contacting the base surface 64.

The recovery step is a step of recovering the base material 20 that has passed through the embossing apparatus 50 (see FIG. 6). That is, in the recovery step, the decorative sheet 10 is recovered from the embossing apparatus 50 by the recovery device 96.

In the embossing method, a conveyance speed of the base material 20 is better to be set to a predetermined value in the range of 0.1 to 10 m/min. Preferably, the conveyance speed of the base material 20 is set to a predetermined value in the range of 0.3 to 5 m/min. By setting the conveyance speed of the base material 20 to 0.1 m/min or more, the following defects can be prevented from occurring to the inner surface E. The defects previously described are shine, discoloration and tearing. The same applies to the back face of the decorative sheet 10. Furthermore, by setting the conveyance speed of the base material 20 to 0.1 m/min or more, it can suppress the embossing receiving die 80 deform by the heat from the embossing die 60. By setting the conveyance speed of the base material 20 to 10 m/min or less, when the base material 20 passes between the embossing die 60 and the embossing receiving die 80, a pressing force can be appropriately applied to the base material 20. A sufficient concave portion 30 can be formed on the front face of the base material 20.

In the embossing step, a pressing time of the base material 20 is better to be set to a predetermined value in the range of 0.01 to 5 seconds. Preferably, the pressing time of the base material 20 is set to a predetermined value in the range of 0.1 to 2 seconds. The pressing time of the base material 20 is appropriately set in consideration of the shape of the mold portion 70. By setting the pressing time of the base material 20 to 0.01 seconds or more, when the base material 20 passes between the embossing die 60 and the embossing receiving die 80, the pressing force can be appropriately applied to the base material 20. A sufficient concave portion 30 can be formed on the front face of the base material 20. By setting the pressing time of the base material 20 to 5 seconds or less, the following defects can be prevented from occurring to the inner surface E. The previously described defects are shine, discoloration and tearing. The same applies to the back face of the decorative sheet 10. Furthermore, by setting the pressing time of the base material 20 to 5 seconds or less, the embossing receiving die 80 can be suppressed from being deformed by the heat from the embossing die 60.

In the embossing step, the pressing force of the base material 20 is better to be set to a predetermined value in the range of 200 to 2000 N/cm. By setting the pressing force of the base material 20 to 200 N/cm or more, when the base material 20 passes between the embossing die 60 and the embossing receiving die 80, the pressing force can be appropriately applied to the base material 20. A sufficient concave portion 30 can be formed on the front face of the base material 20. By setting the pressing force of the base material 20 to 2000 N/cm or less, the following defects can be prevented from occurring to the inner surface E. The previously described defects are shine, discoloration and tearing. The same applies to the back face of the decorative sheet 10. Furthermore, by setting the pressing force of the base material 20 to 2000 N/cm or less, the embossing receiving die 80 can be suppressed from being deformed by the heat from the embossing die 60.

<Effect of Embodiment>

According to the embodiment, the following effects can be obtained.

(1) The decorative sheet 10 includes the base material 20 and the concave portion 30 (see FIGS. 1, 2, 4 and 5). The concave portion 30 is provided on the front face of the base material 20. The concave portion 30 includes the concavo-convex patterns F1, F2, F3 and F4 on the inner surface E. That is, in the concave portion 30, the concavo-convex pattern F1 is provided in the region G1 of the bottom surface E0. Further, the concavo-convex pattern F2 is provided in the regions G2 and G3 of the bottom surface E0. Furthermore, the concavo-convex pattern F3 is provided in the entire region of the first wall surface E1. Moreover, the concavo-convex pattern F4 is provided in the entire region of the second wall surface E2.

Thus, the state of the reflection of the light at the region G1, and regions G2 and G3 can be differed. Further, the state of the reflection of the light at the region G1 and the first wall surface E1 can be differed, and the state of the reflection of the light at the region G1 and the second wall surface E2 can be differed. Furthermore, the state of the reflection of the light at the regions G2 and G3, and the first wall surface E1 can be differed, and the state of the reflection of the light at the regions G2 and G3, and the second wall surface E2 can be differed. Moreover, the state of the reflection of the light at the first wall surface E1 and the second wall surface E2 can be differed. When the front face of the decorative sheet 10 is viewed from two or more different directions, a viewer of the decorative sheet 10 can be tricked that the same concave portion 30 is a different concave portion. It is possible to deal with various illusionary effects. The design variation of the decorative sheet 10 can be enriched. A new decorative sheet 10 serving as a front face fabric for a predetermined product can be obtained.

(2) The embossing apparatus 50 is provided with the embossing die 60, the embossing receiving die 80 and the heating unit 90 (see FIG. 6). In the embossing die 60, the mold portion 70 includes the four types of concavo-convex portions K1, K2, K3 and K4 as the concavo-convex portion K (see FIGS. 6 and 7). The concavo-convex portion K1 corresponds to the concavo-convex pattern F1 and is provided in the region L1 of the top surface J0. The concavo-convex portion K2 corresponds to the concavo-convex pattern F2 and is provided in the regions L2 and L3 of the top surface J0. The concavo-convex portion K3 corresponds to the concavo-convex pattern F3 and is provided in the region M1 of the third wall surface J1. The concavo-convex portion K4 corresponds to the concavo-convex pattern F4 and is provided in the region M2 of the fourth wall surface J2. The embossing apparatus 50 performs the embossing method. Therefore, the decorative sheet 10 can be manufactured by the embossing apparatus 50.

<Modifications>

The embodiment can also be configured as follows. Some configurations of modifications illustrated below may also be employed in combination as appropriate. In the following description, points different from the above description are described, and the description of similar points is omitted as appropriate.

(1) The concave portion 30 includes the concavo-convex patterns F1 and F2 on the bottom surface E0, includes the concavo-convex pattern F3 on the first wall surface E1, and includes the concavo-convex pattern F4 on the second wall surface E2 (see FIGS. 2, 4 and 5). That is, in the concave portion 30, any concavo-convex pattern F among the concavo-convex patterns F1, F2, F3 and F4 of is provided in the entire region of the inner surface E. In the partial region of the inner surface of the concave portion, the concavo-convex pattern F can be omitted. In this case, the region of the inner surface in which the concavo-convex pattern F is omitted becomes a smooth state. In the embossing die, the mold portion is shaped to correspond to the concave portion.

(2) The concave portion 30 includes the bottom surface E0 (see FIGS. 2, 4 and 5). In the decorative sheet, the concave portion may be a concave portion which does not include a bottom surface. An example of a concave portion which does not include a bottom surface is a right-cone shaped concave portion. When the concave portion is pyramid-shaped, the inner surface of this concave portion is formed by a plurality of wall surfaces. When the concave portion is circular cone shaped, the inner surface of this concave portion is formed by one wall surface. Other than this, examples of a concave portion which does not include a bottom surface are a hemispherical shaped concave portion and a concave portion which penetrates the base material 20 in the thickness direction (through hole). In the embossing die, the mold portion is shaped to correspond to the concave portion.

Figure 8:
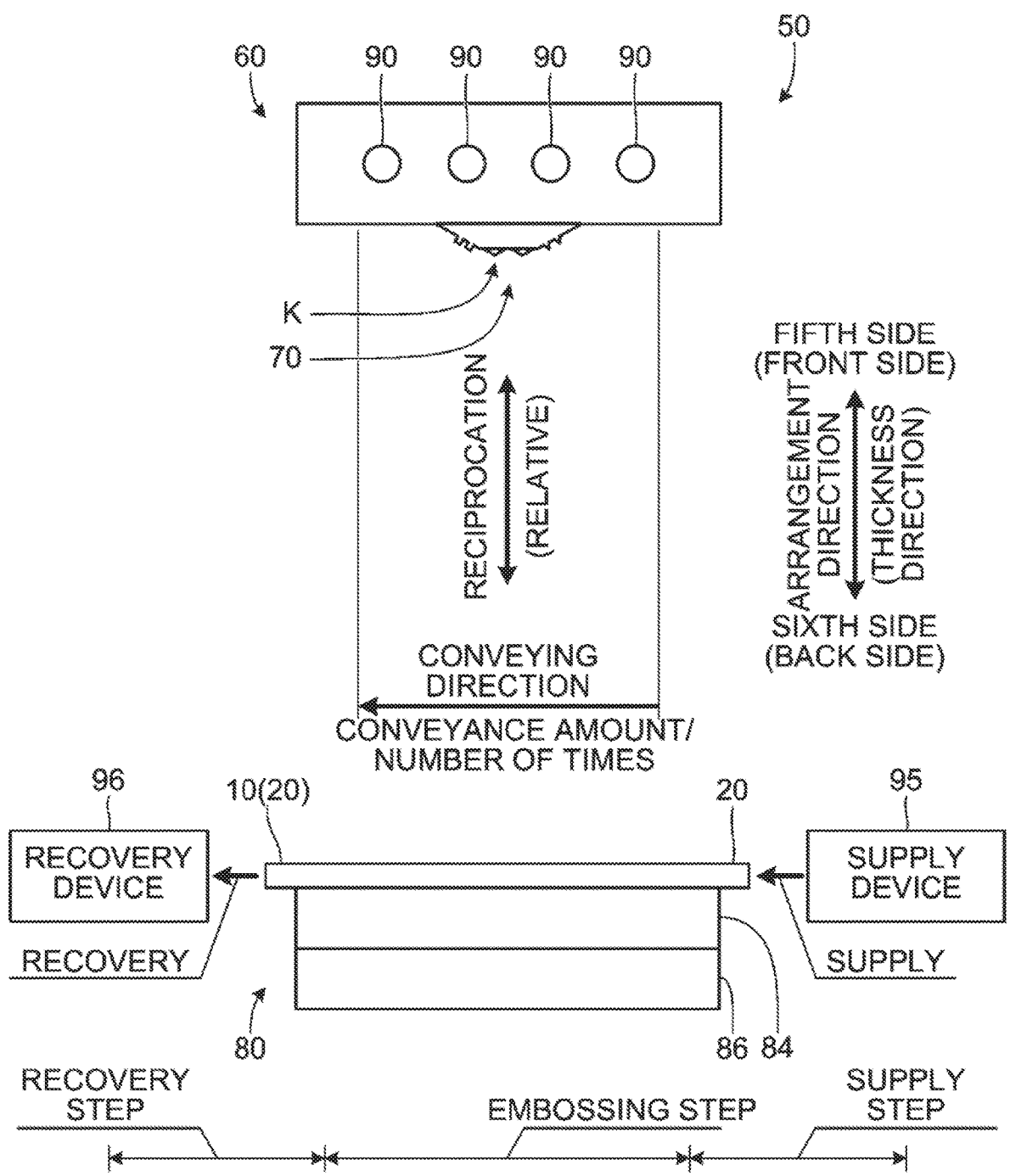
FIG. 8 is a side view which shows another example of a schematic structure of the embossing apparatus. The embossing die and the embossing receiving die have a flat plate shape. The state in which the embossing die is moved to a fifth side in an arrangement direction with respect to the embossing receiving die is shown. In the base material and the decorative sheet, parts corresponding to the embossing apparatus are shown.

(3) In the embossing apparatus 50, the embossing die 60 and the embossing receiving die 80 have a roll shape and is supported to be rotatable in a direction corresponding to the conveying direction (see FIG. 6). The embossing die and the embossing receiving die may have a shape different from the roll shape. For example, the embossing die 60 and the embossing receiving die 80, as shown in FIG. 8, may have a flat plate shape. In FIG. 8, in order to clarify the correspondence with FIG. 6, the reference numerals for the respective parts are the same as those mentioned above. In the embossing apparatus 50 of FIG. 8, as the embossing apparatus 50 of FIG. 6, the arrangement direction is the vertical direction and the conveying direction is the horizontal direction. In FIG. 8, as in FIG. 6, the illustrations of following parts are simplified. The previously described parts are the base material 20 and the decorative sheet 10, and the supply device 95 and the recovery device 96.

In the embossing method performed by an embossing apparatus 50 of FIG. 8, the embossing die 60 reciprocates relative to the embossing receiving die 80. In this relative reciprocation movement, a movement from the fifth side to the sixth side in the arrangement direction and a movement from the sixth side to the fifth side in the arrangement direction are repeated. The base material 20 is intermittently conveyed in the conveying direction in a state in which the embossing die 60 is moved to the fifth side in the arrangement direction with respect to the embossing receiving die 80. A single conveyance amount is an amount which coincides with the interval W (see FIGS. 1 and 4).

Figure 9:
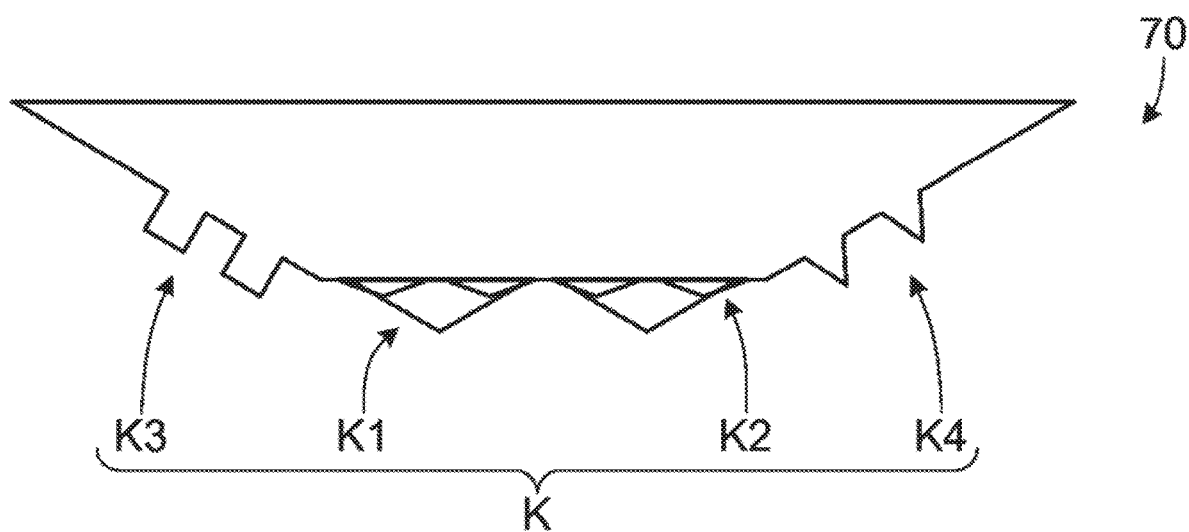
FIG. 9 is an enlarged side view which shows the mold portion. The mold portion corresponds to the mold portion of the embossing die of FIG. 8.

The embossing die 60 is provided with the heating unit 90. During the embossing method, the heating unit 90 heats the embossing die 60. A heating unit is not provided in the embossing receiving die 80. In the embossing receiving die 80, the following surface is a flat surface which is smooth. The surface previously described is an outer surface of the elastic unit 84 that forms an outer surface of the embossing receiving die 80. The elastic unit 84 is provided on an outer surface of the main body unit 86. In a state in which the embossing die 60 is moved to the sixth side in the arrangement direction, the base material 20 is sandwiched by the embossing die 60 and the embossing receiving die 80. The base material 20 contacts the elastic unit 84 with its back face and is supported by the embossing receiving die 80 from the back side. The base material 20 contacts the mold portion 70 with its front face and is pressed by the mold portion 70. The mold portion 70 includes the four types of concavo-convex portions K1, K2, K3 and K4 as the concavo-convex portion K (see FIG. 9). The concavo-convex portions K1, K2, K3 and K4 bites into the base material 20. Along with this, the concave portions 30 are formed on the front face of the base material 20 in the same manner as described above. However, in FIG. 8, the illustration of the concave portions 30 is omitted.

The relative movement of the embossing die 60 and the embossing receiving die 80 is better to be performed by reciprocating the embossing die 60 in the arrangement direction in a manner in which the position of the embossing receiving die 80 is fixed (see FIG. 8). However, the relative movement of the embossing die 60 and the embossing receiving die 80 may be a different aspect from this. For example, the relative movement of the embossing die 60 and the embossing receiving die 80 may be performed by reciprocating both the embossing die 60 and the embossing receiving die 80 in the arrangement direction. In the embossing apparatus, the embossing die and the embossing receiving die may be, for example, as follows. That is, the embossing apparatus may include the roll shaped embossing die 60 (see FIG. 6) and the flat plate shaped embossing receiving die 80 (see FIG. 8).

(4) In the embossing receiving die 80, the elastic unit 84 is provided on the outer peripheral surface of the main body unit 86 (see FIG. 6). In the embossing receiving die, the main body unit 86 may be omitted. In the case in which the main body unit 86 in the roll shaped embossing receiving die is omitted, the shaft is fixed to the elastic unit. In the embossing receiving die, the shaft may be also formed of the same material as the elastic unit. Other than this, in the embossing receiving die, the elastic unit 84 may be omitted. For example, the embossing receiving die may be made of metal which does not include the elastic unit 84.

DESCRIPTION OF REFERENCE SIGNS

10 Decorative sheet
20 Base material
22 First sheet
24 Second sheet
26 Third sheet
30 Concave portion
50 Embossing apparatus
60 Embossing die
62 Shaft
64 Base surface
70 Mold portion
80 Embossing receiving die
82 Shaft
84 Elastic unit
86 Main body unit
90 Heating unit
95 Supply device
96 Recovery device
E Inner surface
E0 Bottom surface
E1 First wall surface
E2 Second wall surface
F, F1, F2, F3, F4 Concavo-convex pattern
G1, G2, G3 Region
J Outer surface
J0 Top surface
J1 Third wall surface
J2 Fourth wall surface
K, K1, K2, K3, K4 Concavo-convex portion
L1, L2, L3 Region
M1, M2 Region
W Interval
θ1, θ2 Inclination angle

The invention claimed is:

1. An upholstery including a decorative sheet comprising:
   a base material including at least one of a fabric or a leather, and
   a concave portion which is provided on a front face of the base material and whose depth direction coincides with a thickness direction of the base material,
   wherein the concave portion further comprises a singular concave recess with an inner surface including a first surface and a second surface different from the first surface, the first surface being a bottom surface,
      a first concavo-convex pattern in a first region of the first surface of the concave portion, the first concavo-convex pattern including at least two rows of first shaped surfaces, the first shaped surfaces disposed at predetermined intervals along the respective rows, and
      a second concavo-convex pattern which is different from the first concavo-convex pattern in a second region of the second surface, the second region being different from the first region, the second concavo-convex pattern including at least two second shaped surfaces, each second shaped surface having an elongate dimension and being rectangular or triangular in cross-section,
   wherein the first concavo-convex pattern is absent from the second surface of the concave portion, and
   wherein an appearance of the concave portion changes with a changing viewing angle.

2. The upholstery according to claim 1,
   wherein the first concavo-convex pattern includes a combination of a first sub-pattern and a second sub-pattern, and the second concavo-convex pattern includes the first sub-pattern and excludes the second sub-pattern.

3. The upholstery according to claim 2, wherein the second surface is a wall surface of the concave portion.

4. The upholstery according to claim 1, wherein the second surface is a wall surface of the concave portion.

5. The upholstery according to claim 1, wherein the singular concave recess is a first concave recess and the concave portion further comprises a second concave recess separate from the first concave recess.

6. The upholstery according to claim 1, wherein each of the first shaped surfaces of the at least two rows of first shaped surfaces is a quadrangular enclosure that includes a plurality of planar surfaces converging at a low point within the quadrangular enclosure.

7. The upholstery according to claim 6, wherein the second surface is a wall surface of the concave portion.

8. An embossing method to form the upholstery of claim 1, the method comprising:
- a providing step which provides the base material;

an embossing step which forms the concave portion of the base material, and
- wherein in the embossing step,
    - the first region of the inner surface of the concave portion is formed in a state to include the first concavo-convex pattern, and
    - the second region of the inner surface which is different from the first region is formed in a state to include the second concavo-convex pattern which is different from the first concavo-convex pattern.

9. The embossing method of claim 8, wherein the method is performed using an embossing die comprising:
- a mold portion which corresponds to the concave portion which is formed on the front face of the base material in a state whose depth direction coincides with the thickness direction of the base material, and which contacts the front face of the base material, wherein the mold portion includes,
- a first concavo-convex portion which corresponds to the first concavo-convex pattern in a third region of an outer surface of the mold portion, the third region corresponding to the first region of the inner surface of the concave portion which is provided with the first concavo-convex pattern, and
- a second concavo-convex portion which corresponds to the second concavo-convex pattern in a fourth region of the outer surface of the mold portion, the fourth region being different from the third region and the fourth region corresponding to the second region of the inner surface which is different from the first region which is provided with the second concavo-convex pattern which is different from the first concavo-convex pattern.

\* \* \* \* \*